(12) United States Patent
Hsu

(10) Patent No.: US 6,644,177 B1
(45) Date of Patent: Nov. 11, 2003

(54) MILK FOAMING STRUCTURE ADAPTED TO A COFFEE MAKER

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/298,055

(22) Filed: Nov. 18, 2002

(51) Int. Cl.[7] .................. A47J 31/40; A47J 31/46; A47J 43/12; A23L 1/00
(52) U.S. Cl. .................. 99/453; 99/287; 99/293; 99/323.1; 99/452; 99/454
(58) Field of Search .................. 99/452–454, 483, 99/275–279, 323.1, 323.3, 293–295, 287; 261/78.1, 121.1, DIG. 16, DIG. 76; 141/70, 82; 366/101, 176.1; 426/477

(56) References Cited

U.S. PATENT DOCUMENTS

| | | | | |
|---|---|---|---|---|
| 4,922,810 A | * | 5/1990 | Siccardi | 99/323.1 |
| 4,949,631 A | * | 8/1990 | Fregnan | 99/452 |
| 5,052,289 A | * | 10/1991 | Di Girolamo | 99/452 |
| 5,189,949 A | * | 3/1993 | Apa | 99/453 |
| 5,295,431 A | * | 3/1994 | Schiettecatte et al. | 99/293 |
| 5,423,245 A | * | 6/1995 | Midden | 99/275 |
| 5,464,574 A | * | 11/1995 | Mahlich | 261/124 |
| 5,738,002 A | * | 4/1998 | Marano-Ducarne | 99/293 |
| 5,768,981 A | * | 6/1998 | Cicchetti | 99/453 |
| 5,862,740 A | * | 1/1999 | Grossi | 99/293 |
| 5,887,511 A | * | 3/1999 | Cappellotto | 99/287 |
| 6,293,187 B1 | * | 9/2001 | Zils | 99/323.1 |
| 6,499,389 B1 | * | 12/2002 | Probst | 99/323.1 |

* cited by examiner

Primary Examiner—Timothy F. Simone
(74) Attorney, Agent, or Firm—Rosenberg, Klein & Lee

(57) ABSTRACT

A milk foaming structure adapted to a coffee maker includes a steam tube, an outer sleeve, and a leak-proof gasket, wherein, a first steam outlet at the lower end of the steam tube, a base plate to the outer sleeve, a second steam outlet on the base plate, a milk suction on the wall of the outer sleeve above the base plate and a cool air suction on the upper wall of the outer sleeve, and a leak-proof gasket in the steam tube to be inserted into the outer sleeve above the cool air suction characterized by providing a plurality of disturbance ribs on the base plate and the wall of the outer sleeve close to the milk suction to faster produce more foamed milk.

1 Claim, 5 Drawing Sheets

MILK FOAMING STRUCTURE ADAPTED TO A COFFEE MAKER

BACKGROUND OF THE INVENTION (a) Field of the Invention

The present invention relates to a milk foaming structure adapted to a coffee maker, and more particularly, to one that provides at its outer sleeve disturbance ribs to faster produce more foamed milk.

(b) Description of the Prior Art

As illustrated in FIG. 5 of the accompanying drawings of the present invention, a conventional coffee maker is adapted with a milk foaming structure (including a steam tube (5) and an outer sleeve (6)). FIG. 4 shows the milk foaming structure essentially comprised of the steam tube (5), the outer sleeve (6), and a leak proof gasket (7). Wherein, a steam outlet (51) is provided at the lower end of the steam tube (5); a base plate (61) is provided to the outer sleeve (6); another steam outlet (611) is provided on the base plate (61); a milk suction (62) is provided on the wall of the outer sleeve (6) above the base plate (61); a cool air suction (63) is provided on the upper wall of the outer sleeve (6); the leak proof gasket (7) in the steam tube (5) is inserted in the outer sleeve (6) above the cool air suction (63); a spacing is reserved between the steam tube (5) and the outer sleeve (6); and a distance being provided between the steam outlet (51) of the steam tube (5) in relation to another steam outlet (611) of the outer sleeve (6). In practice, a lever of milk (81) inside a milk cup (8) is required to flood over halfway of the milk suction (62) of the outer sleeve (6) so that once the steam is discharged through the steam outlet (51) of the steam tube (5), cool air is pulled in through the cool air suction (63) and the milk (81) is drawn in through the milk suction (62) for both to be agitated to produce foamed milk through the steam outlet (61) in the outer sleeve (6).

However, although the prior art produces foamed milk while making the coffee, consumer could expect a structure that faster produce more foamed milk.

SUMMARY OF THE INVENTION

The primary purpose of the present invention is to provide an improved milking foaming structure adapted to a coffee maker. To achieve the purpose, the milk foaming structure is comprised of a steam tube, an outer sleeve, and a leak proof gasket. Wherein, a steam outlet is provided at the lower end of the steam tube; a base plate is provided to the outer sleeve and another steam outlet is provided on the base plate; a milk suction is provided on the wall of the outer sleeve above the base plate; a cool air suction is provided on the upper wall of the outer sleeve; the leak-proof gasket provided on the steam tube for the steam tube to be inserted into the outer sleeve above the cool air suction; a spacing is reserved between the steam tube and the outer sleeve, and the steam outlet of the steam tube is kept a certain distance from another steam outlet of the base plate characterized by that a plurality of disturbance ribs are provided on the base plate of the outer sleeve and on the wall of the outer sleeve by the milk suction to create disturbance by discharged steam in helping agitate milk and cool air to faster produce more foamed milk.

DETAILED DESCRIPTION OF THE PREFERRED EMBODIMENTS

Figure 1:
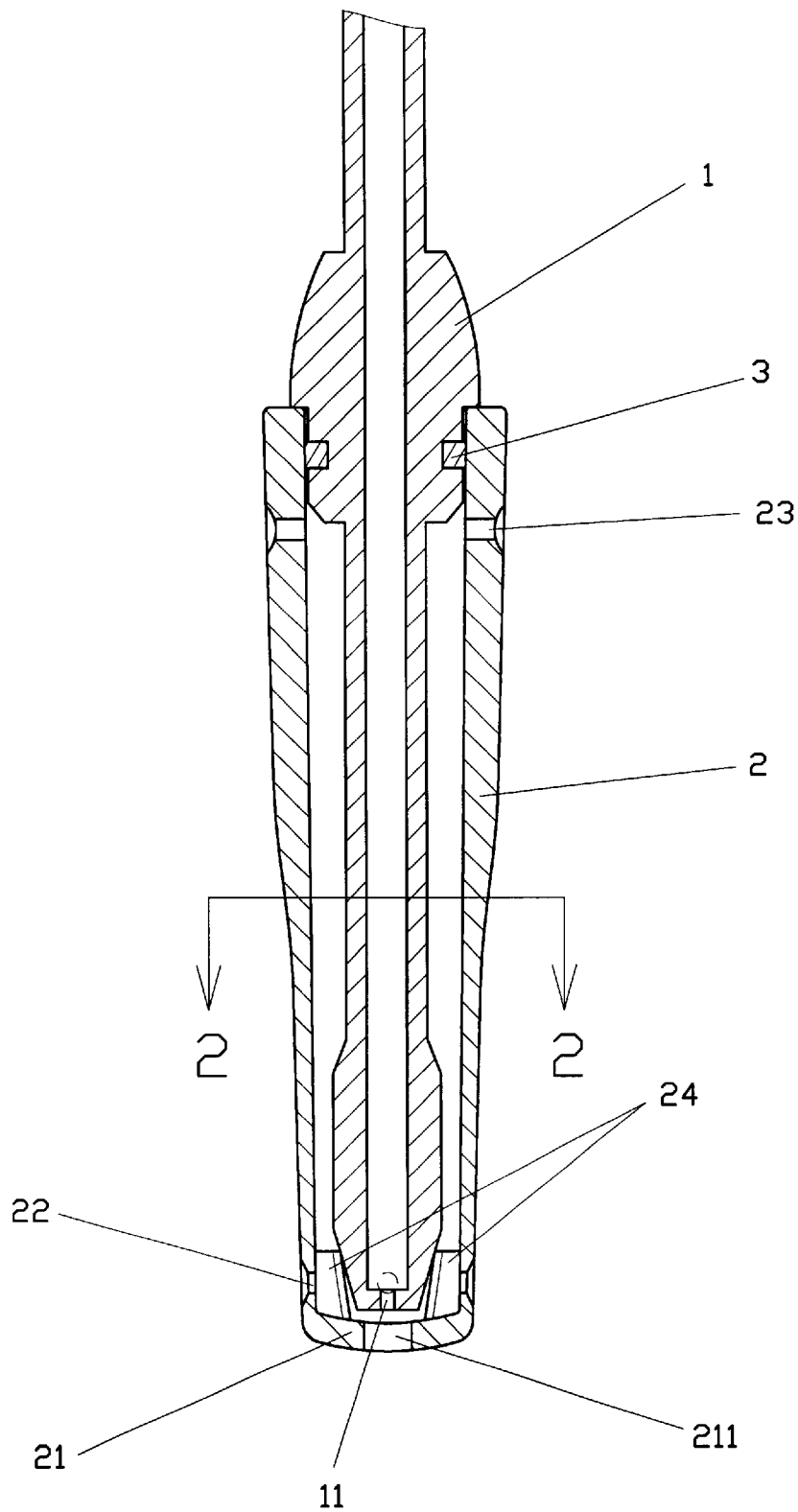
FIG. 1 is sectional view (longitudinal section) of a preferred embodiment of the present invention.
Figure 2:
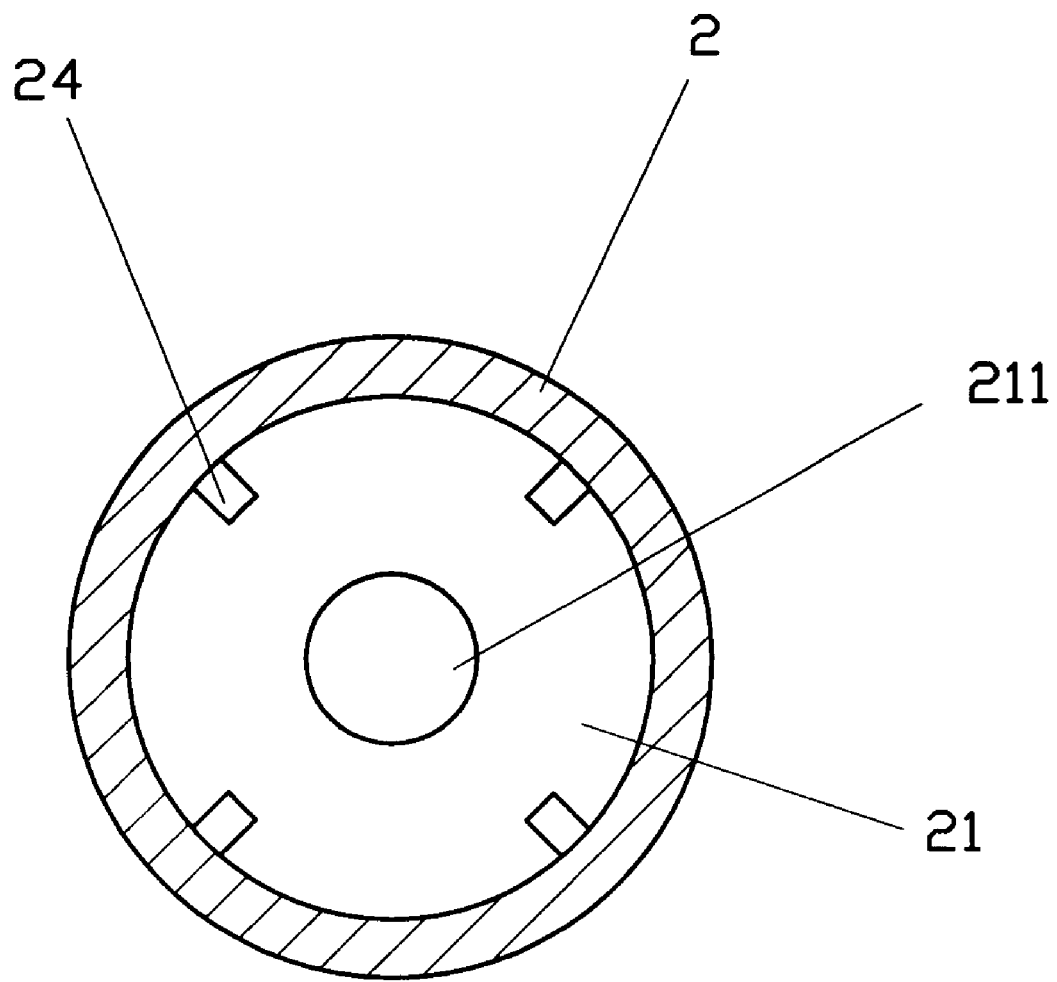
FIG. 2 is another sectional view (cross section taken from 2—2 in FIG. 1) of the preferred embodiment of the present invention.

Referring to FIGS. 1 and 2, a preferred embodiment of the present invention is comprised of a steam tube (1), an outer sleeve (2), and a leak proof gasket (3). Wherein, a first steam outlet (11) is provided at the lower end of the steam tube (1); a base plate (21) is provided to the outer sleeve (2) and a second steam outlet (211) is provided on the base plate (21); a milk suction (22) is provided on the wall of the outer sleeve (2) at where above the base plate (21); and a cool air suction (23) is provided on the upper wall of the outer sleeve (2); a plurality of disturbance ribs (24) are respectively provided on the base plate (21) of the outer sleeve (2) and on the wall of the outer sleeve (2) by the milk suction (22); the leak-proof gasket (3) is provided on the steam tube (1) to be inserted into the outer sleeve (2) at where above the cool air suction (23); a spacing is reserved between the steam tube (1) and the outer sleeve (2) and the first steam outlet (11) of the steam tube (1) is kept a certain distance from the second steam outlet (211) of the base plate (21).

Figure 3:
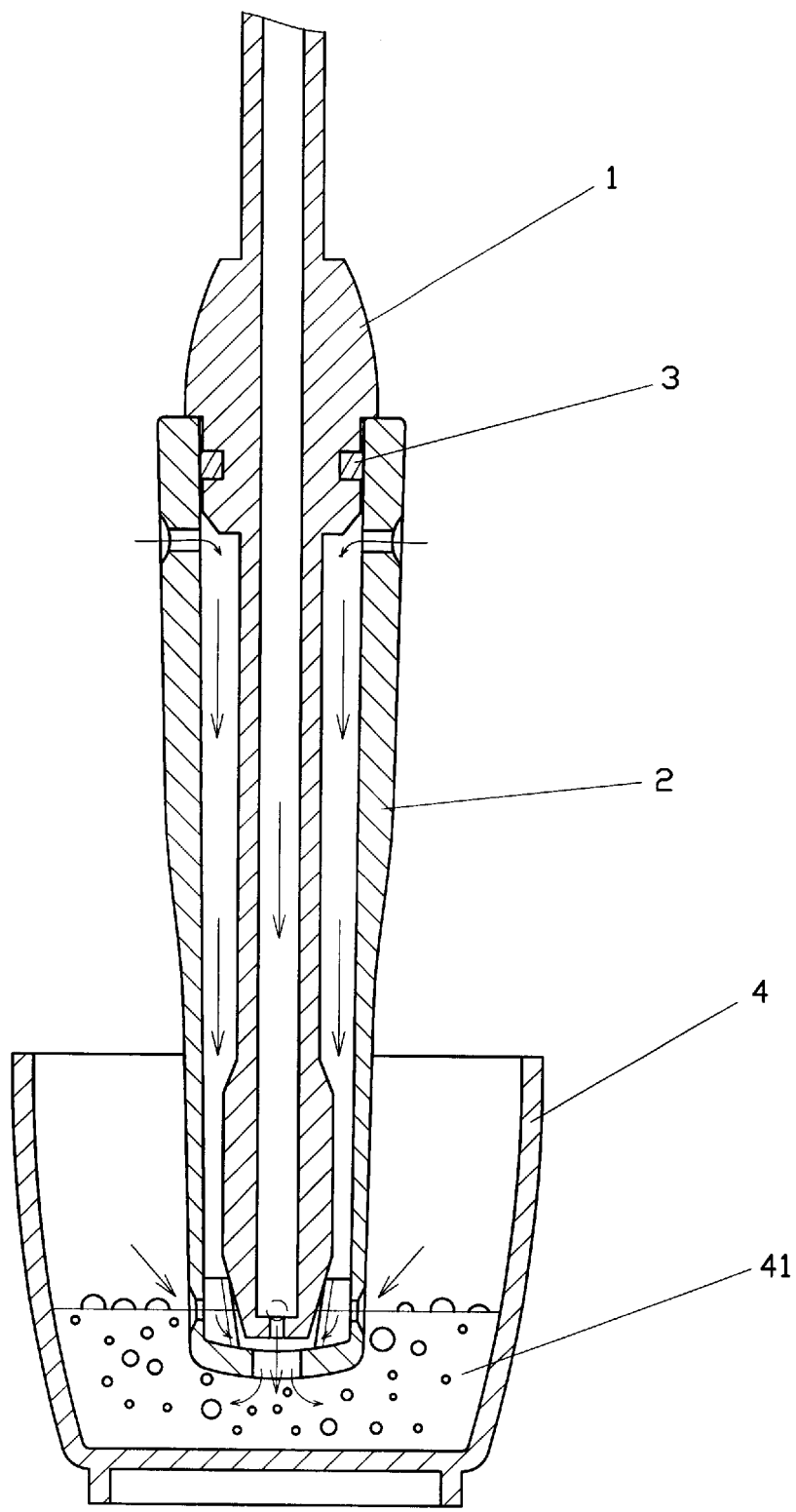
FIG. 3 is a sectional view showing that the preferred embodiment of the present invention is in operation.
Figure 4:
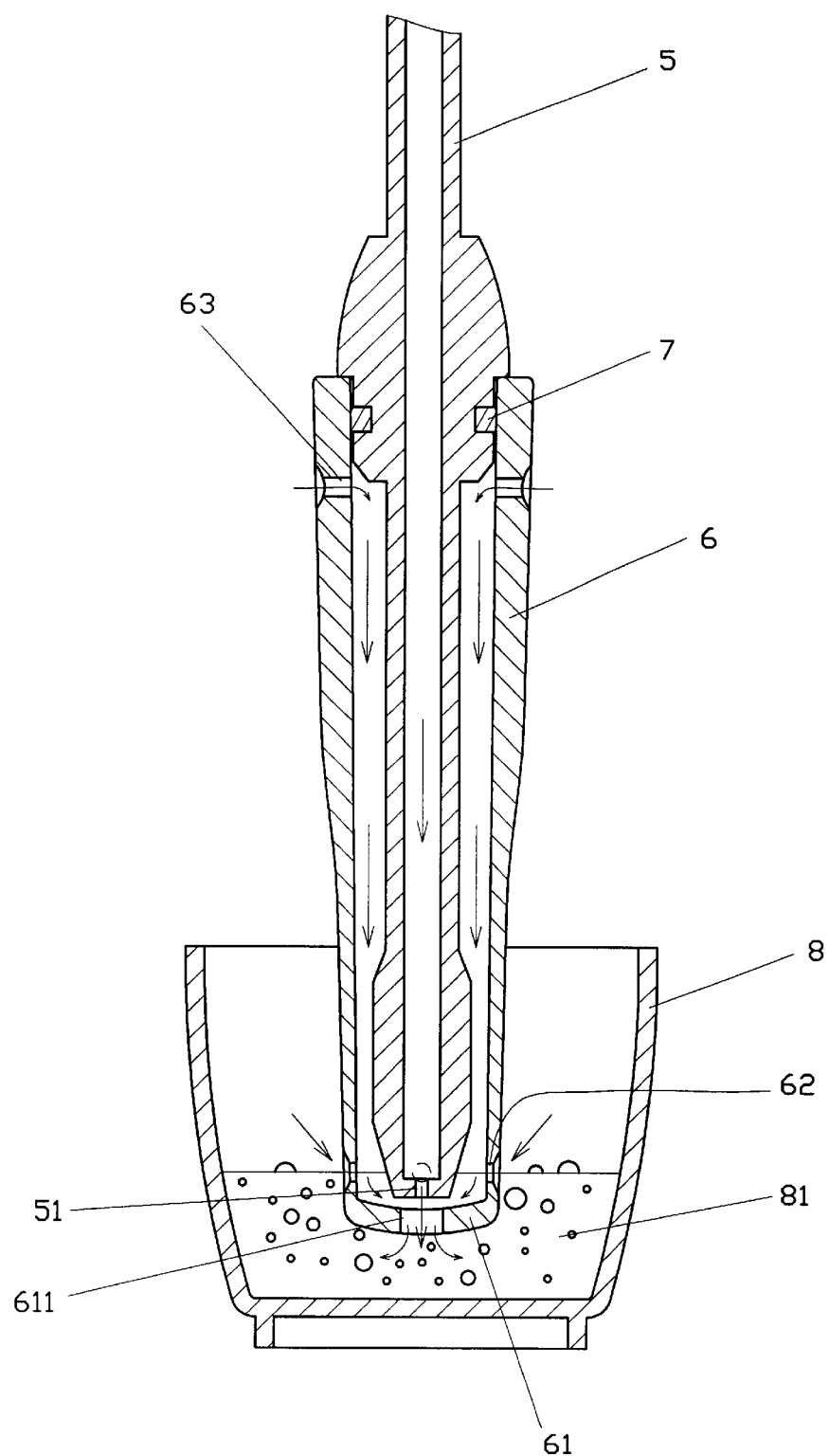
FIG. 4 is a sectional view (longitudinal section) of a prior art in operation.
Figure 5:
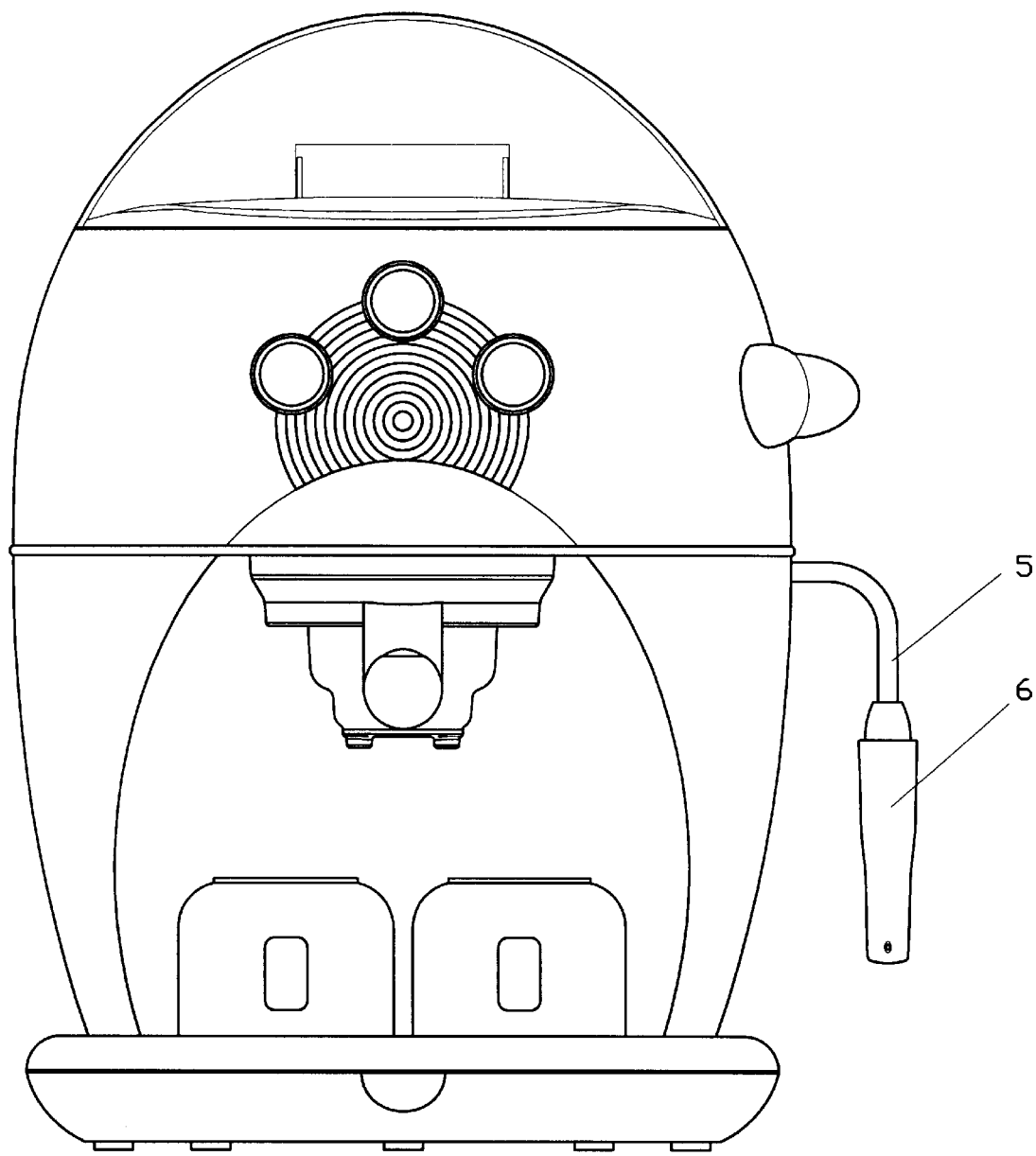
FIG. 5 is a front view of the prior art adapted to a coffee maker.

In practice as illustrated in FIG. 3, a lever of milk (41) inside a milk cup (4) is required to flood over half way of the steam outlet (11) of the steam tube (1) and the disturbance ribs (24) create disturbance to the steam discharged through the first steam outlet (11) of the steam tube (1) so that the cool air is pulled in through the cool air suction (23) of the outer sleeve (2) to faster produce more foamed milk from the milk drawn in through the milk suction (22).

The present invention by providing additional disturbance ribs (24) to the outer sleeve (2) to faster produce more foamed milk than the prior art does.

I claim:

1. A milk foaming structure adapted to a coffee maker comprising a steam tube, an outer sleeve, and a leak proof gasket; a first steam outlet being provided at a lower end of the steam tube; a base plate being provided to the outer sleeve; a second steam outlet being provided on the base plate; a milk suction being provided on the wall of the outer sleeve above the base plate; a cool air suction being provided on an upper wall of the outer sleeve; the leak proof gasket being provided on the steam tube above the cool air suction of the outer sleeve; a spacing being reserved between the steam tube and the outer sleeve; a distance being provided between the first steam outlet of the steam tube and the second steam outlet of the outer sleeve, and the improvements comprising:

a plurality of disturbance ribs being provided on the base plate of the outer sleeve and the wall of the outer sleeve close to the milk suction.

* * * * *